(12) United States Patent
Fujimoto et al.

(10) Patent No.: US 10,670,094 B2
(45) Date of Patent: Jun. 2, 2020

(54) BRAKE LINING FOR A RAILWAY VEHICLE AND DISC BRAKE EQUIPPED WITH THE SAME

(71) Applicants: NIPPON STEEL & SUMITOMO METAL CORPORATION, Tokyo (JP); CENTRAL JAPAN RAILWAY COMPANY, Aichi (JP)

(72) Inventors: Takahiro Fujimoto, Tokyo (JP); Atsushi Sakaguchi, Tokyo (JP); Naruo Miyabe, Tokyo (JP); Tomohiro Otsuka, Nagoya (JP); Seiji Kanamori, Nagoya (JP); Jun Asano, Nagoya (JP)

(73) Assignees: NIPPON STEEL CORPORATION, Tokyo (JP); CENTRAL JAPAN RAILWAY COMPANY, Aichi (JP)

( * ) Notice: Subject to any disclaimer, the term of this patent is extended or adjusted under 35 U.S.C. 154(b) by 0 days.

(21) Appl. No.: 15/768,563

(22) PCT Filed: Oct. 19, 2016

(86) PCT No.: PCT/JP2016/080921
§ 371 (c)(1),
(2) Date: Apr. 16, 2018

(87) PCT Pub. No.: WO2017/069140
PCT Pub. Date: Apr. 27, 2017

(65) Prior Publication Data
US 2018/0259018 A1   Sep. 13, 2018

(30) Foreign Application Priority Data
Oct. 21, 2015   (JP) ................................. 2015-207153

(51) Int. Cl.
*F16D 65/097* (2006.01)
*B61H 5/00* (2006.01)
(Continued)

(52) U.S. Cl.
CPC ........... *F16D 65/0972* (2013.01); *B61H 5/00* (2013.01); *F16D 65/0006* (2013.01);
(Continued)

(58) Field of Classification Search
CPC .... F16D 55/22; F16D 65/0972; F16D 65/092; F16D 69/0408; F16D 2069/0433; F16D 2069/0408; B61H 5/00
See application file for complete search history.

(56) References Cited

U.S. PATENT DOCUMENTS 2,713,923 A * 7/1955 Eksergian ................ B61H 5/00
188/251 A
5,538,108 A * 7/1996 Russo .................... F16D 65/092
188/250 B
(Continued)

FOREIGN PATENT DOCUMENTS

JP   59-200825   11/1984
JP   2000-145848   5/2000
(Continued)

*Primary Examiner* — Vishal R Sahni
(74) *Attorney, Agent, or Firm* — Clark & Brody LP

(57) ABSTRACT

A brake lining includes friction structures, back boards fastened to respective the friction structures, a base plate supporting the friction structures. Each of the friction structures includes two adjacent friction portions with a groove formed in the front surface in between, and a thin portion with a smaller thickness than thicknesses of the friction portions, the thin portion located in a position corresponding to the groove. Each of the friction structures is supported by the base plate on two support points located in the two friction portions respectively. The thin portion has a constant length, the length being equal to a maximum width of the friction portions and satisfying a condition that L/D is equal to or greater than 1.1, where D denotes the length of the thin
(Continued)

portion and L denotes a distance between the two support points located in the friction portions.

8 Claims, 3 Drawing Sheets

(51) Int. Cl.
    *F16D 65/092*      (2006.01)
    *F16D 69/00*      (2006.01)
    *F16D 65/00*      (2006.01)
    *F16D 69/04*      (2006.01)

(52) U.S. Cl.
    CPC ....... *F16D 65/092* (2013.01); *F16D 65/0971* (2013.01); *F16D 69/00* (2013.01); *F16D 69/0408* (2013.01); *F16D 2069/004* (2013.01); *F16D 2069/0433* (2013.01)

(56) References Cited

U.S. PATENT DOCUMENTS

| | | | | |
|---|---|---|---|---|
| 6,244,396 | B1* | 6/2001 | Lumpkin | B62L 1/10 |
| | | | | 188/24.11 |
| 7,648,007 | B2* | 1/2010 | Russo | F16D 65/0006 |
| | | | | 188/250 B |
| 9,394,953 | B2* | 7/2016 | Kato | B61H 5/00 |
| 2016/0131208 | A1* | 5/2016 | Misumi | F16D 65/12 |
| | | | | 188/73.1 |

FOREIGN PATENT DOCUMENTS

| | | |
|---|---|---|
| JP | 2002-340056 | 11/2002 |
| JP | 2006-194429 | 7/2006 |
| JP | 2011-214629 | 10/2011 |
| JP | 2012-251597 | 12/2012 |
| JP | 2014-129874 | 7/2014 |

\* cited by examiner

BRAKE LINING FOR A RAILWAY VEHICLE AND DISC BRAKE EQUIPPED WITH THE SAME

TECHNICAL FIELD

The present invention relates to a disc brake for use as a braking device for a railway vehicle. In particular, the present invention relates to a railway brake lining configured to be pressed against a sliding surface of a brake disc fastened to a wheel or an axle of a railway vehicle, and a disc brake equipped with the brake lining.

BACKGROUND ART

In recent years, as land transportation vehicles, such as railway vehicles, automobiles, motorcycles and the like, become faster and larger, disc brakes become used more commonly as braking devices for those vehicles. A disc brake is a device that produces a braking force by means of friction generated by sliding contact between a brake disc and a brake lining.

As a disk brake for a railway vehicle, a donut-shaped brake disc is mounted and fastened to a wheel or an axle. A brake caliper presses a brake lining against a sliding surface of the brake disc, and thereby, a braking force is produced. In this manner, the rotation of the wheel or the axle is controlled, so that the running vehicle slows down.

During operation of the disk brake, noise that is called "brake squeak" occurs. Brake squeak is considered to occur based on the following principles. When the brake lining is pressed against the brake disk for braking, the friction between the brake lining and the brake disk causes the whole brake unit to vibrate unstably, that is, causes a "self-excited vibration" of the whole brake unit. The self-excited vibration is a vibration with its amplitude increasing. External steady energy turns into vibration energy inside the system, and the vibration energy vibrates the system itself. In this way, a self-excited vibration occurs. In order to suppress the brake squeak, it is necessary to suppress the self-excited vibration caused by the friction during the braking motion.

Japanese Patent Application Publication No. 2002-340056 (Patent Literature 1) discloses a disk brake wherein a piston presses a pad against a brake disk. In the disk brake, the pad is moved downstream along the rotation of the brake disk and moved toward a trailing side (contact ending side) by the frictional resistance of the pad pressed against the brake disk. Accordingly, the contact area of the piston with the pad is greater in the trailing side that is downstream with respect to the rotation direction of the brake disk than in the leading side that is upstream with respect to the rotation direction of the brake disk. Patent Literature 1 states that this structure suppresses self-excited vibration and thereby suppresses brake squeak.

Japanese Patent Application Publication No. 2011-214629 (Patent Literature 2) discloses a brake lining including a base plate and a plurality of friction members. Each of the friction members is fastened to the base plate via an elastic member. The support stiffness of the elastic member depends on the position of the friction member on the base plate. Patent Literature 2 states that this structure suppresses brake squeak.

Japanese Patent Application Publication No. 2012-251597 (Patent Literature 3) discloses a brake lining including a base plate and a plurality of friction members. FIG. 1 is a plan view showing the structure of the brake lining disclosed in Patent Literature 3. In the brake lining 32, each of the friction members 33 is fastened to the base plate 36 via an elastic member. Each of the friction members 33 is supported by the base plate 36 with a portion including the center fastened to the base plate 36. Two adjacent friction members 33 are connected by a back board 34. The friction members 33 are circular in planar shape, and the friction members 33 are substantially equal in diameter.

The back board 34 includes circular disk portions which are almost the same size and shape as the friction members 33 in a planar view, and a connection portion connecting these two circular disk portions. The width (dimension in a direction perpendicular to the length direction of the back board 34) of the connection portion is smaller than the widths of the circular disk portions. Accordingly, the back board 34 as a whole is narrow in the middle with respect to the length direction.

CITATION LIST

Patent Literature

Patent Literature 1: Japanese Patent Application Publication No. 2002-340056

Patent Literature 2: Japanese Patent Application Publication No. 2011-214629

Patent Literature 3: Japanese Patent Application Publication No. 2012-251597

SUMMARY OF INVENTION

Technical Problem

When the technique disclosed in Patent Literature 1 is to be applied to an existing vehicle with a disk brake, it is necessary to replace not only the brake lining but also the brake caliper configured to press the brake lining, and this affects the design of the whole disk brake. Therefore, it is difficult to apply the technique to an existing vehicle.

In the structure of the brake lining disclosed in Patent Literature 2, the support stiffness of each of the elastic members needs to be adjusted in accordance with the position thereof on the base plate. Therefore, the manufacture management is complicated.

In the brake lining 32 disclosed in Patent Literature 3, two friction members 33 are connected together by a back board 34 with the object of suppressing turns of the friction members 33 and the object of suppressing variation in friction coefficient between the friction members 33. Patent Literature 3 does not discuss suppression of brake squeak.

In view of the situation, an object of the present invention is to provide a brake lining for a railway vehicle that has a stabilized friction coefficient and suppresses brake squeak easily, and a disk brake equipped with the brake lining.

Solution to Problem

A brake lining according to an embodiment of the present invention is a brake lining configured to be pressed against a sliding surface of a brake disk fastened to a wheel or an axle of a railway vehicle. The brake lining includes a plurality of friction structures of which front surfaces are to face the sliding surface of the brake disk; back boards fastened to respective back surfaces of the friction structures; a base plate supporting the friction structures; and elastic members located behind the respective friction structures, between the base plate and the respective back boards. Each of the friction structures includes two adjacent friction portions with a groove formed in the front surface in between, and a thin portion with a smaller thickness than thicknesses of the friction portions, the thin portion located in a position corresponding to the groove. Each of the friction structures is supported by the base plate on two support points located in the two friction portions respectively. In a planar view, each of the back boards has a contour overlapping a contour of the friction structure which the back board is fastened to. The thin portion has a constant length in a width direction of the friction portions, and the length is equal to a maximum width of the friction portions. The length of the thin portion satisfies a condition that L/D is equal to or greater than 1.1, where D denotes the length of the thin portion and L denotes a distance between the two support points located in the friction portions.

A disk brake according to an embodiment of the present invention includes a brake disk fastened to a wheel or an axle of a railway vehicle, and the above-described brake lining to be pressed against a sliding surface of the brake disk.

Advantageous Effects of Invention

The brake lining according to an embodiment of the present invention and the disk brake equipped with the brake lining can stabilize the friction coefficient and can suppress brake squeak. Also, it is easy to apply the brake lining according to the embodiment of the present invention to an existing vehicle, and the manufacture management of the brake lining is simple.

DESCRIPTION OF EMBODIMENTS

Figure 1:
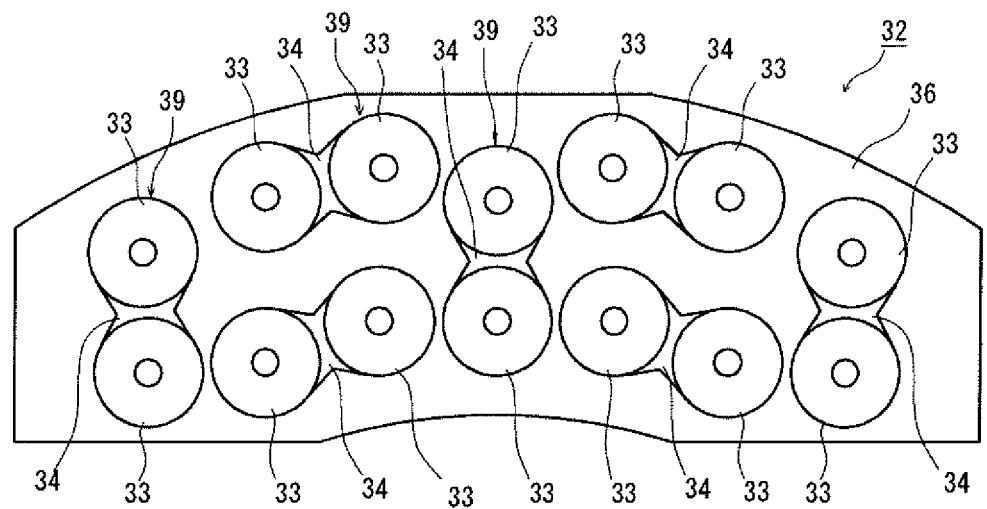
FIG. 1 is a plan view of a conventional brake lining.

After a study, the inventors found that the conventional brake lining 32 having the structure shown by FIG. 1 makes a loud brake squeak. The inventors also found that an increase in the stiffness of each whole block 39 could result in stabilization of the friction property and suppression of the brake squeak. A block 39 is composed of a pair of friction members 33 and a back board 34 disposed on the back sides of the pair of friction members 33. However, the brake squeak suppressing effect due to an increase in the stiffness of the whole block 39 could be obtained only when the rate of the distance between the respective support points of the friction members 33 to the maximum width (diameter) of the friction members 33 was great in some degree.

A brake lining according to the present invention was accomplished based on these findings. Specifically, the brake lining includes a plurality of friction structures of which front surfaces are to face the sliding surface of the brake disk; back boards fastened to respective back surfaces of the friction structures; a base plate supporting the friction structures; and elastic members located behind the respective friction structures, between the base plate and the respective back boards. Each of the friction structures includes two adjacent friction portions with a groove formed in the front surface in between, and a thin portion with a smaller thickness than thicknesses of the friction portions, the thin portion located in a position corresponding to the groove. Each of the friction structures is supported by the base plate on two support points located in the two friction portions respectively. In a planar view, each of the back boards has a contour overlapping a contour of the friction structure which the back board is fastened to. The thin portion has a constant length in a width direction of the friction portions, and the length is equal to a maximum width of the friction portions. When the length of the thin portion is denoted by D and when the distance between the two support points of the friction portions is denoted by L, L/D is equal to or greater than 1.1.

A disk brake according to an embodiment of the present invention includes a disk brake fastened to a wheel or an axle of a railway vehicle, and the above-described brake lining to be pressed against a sliding surface of the brake disk.

Figure 2A:
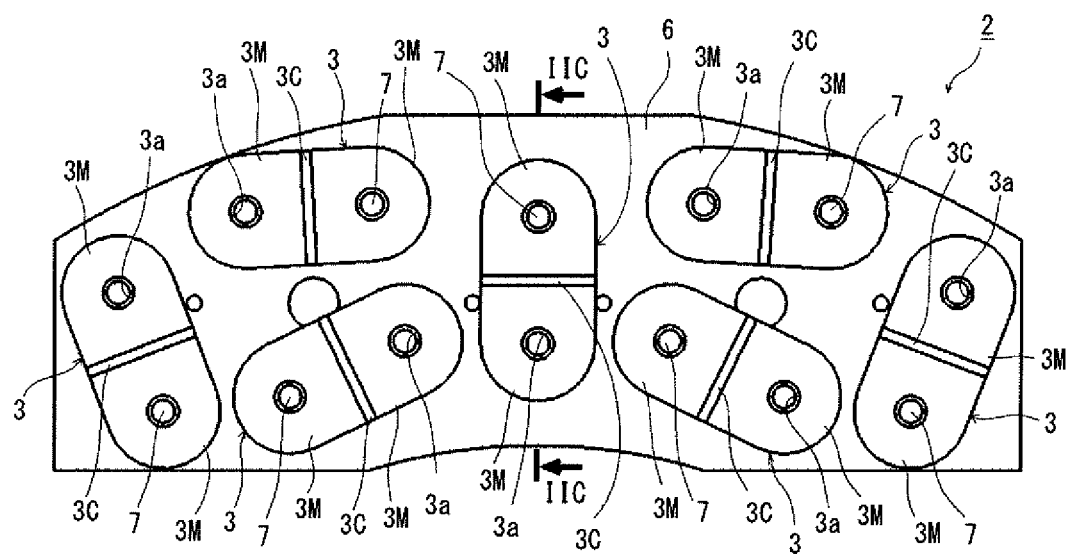
FIG. 2A is a plan view of a brake lining according to an embodiment of the present invention.
Figure 2B:
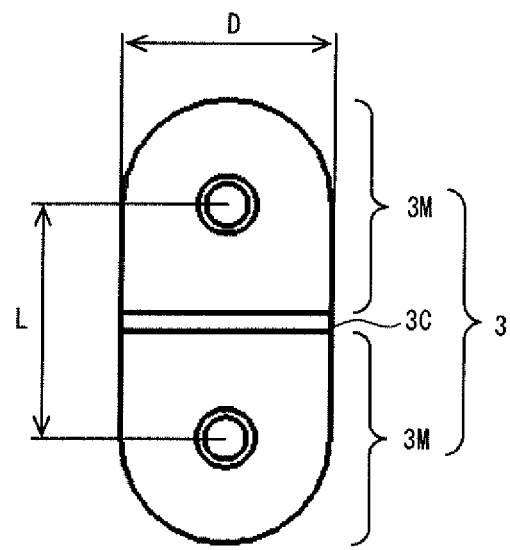
FIG. 2B is a plan view of a friction structure of the brake lining shown in FIG. 2A.
Figure 2C:
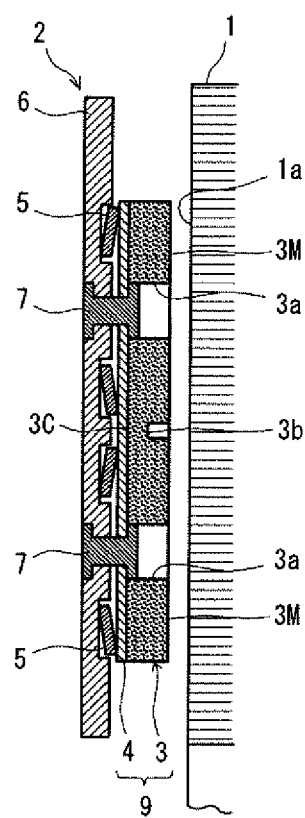
FIG. 2C is a sectional view of the brake lining shown in FIG. 2A along the line IIC-IIC.

A railway disk brake according to an embodiment of the present invention will hereinafter be described. FIGS. 2A to 2C are views showing a brake lining according to an embodiment of the present invention. FIG. 2A is a plan view of the brake lining. FIG. 2B is a plan view of a friction structure of the brake lining. FIG. 2C is a sectional view along the line IIC-IIC in FIG. 2A. FIG. 2A is a view of the brake lining from its front side that is to face the brake disk.

The disk brake according to the embodiment, as shown in FIG. 2C, includes a brake disk 1 and a brake lining 2. The brake lining 2 is attached to a brake caliper (not shown). The brake disk 1 is a donut-shaped disk in a planar view. The brake disk 1 is fastened to a wheel or an axle (not shown) securely by a volt or the like.

For braking, the brake caliper is activated to press the brake lining 2 against a sliding surface 1a of the brake disk 1. This generates sliding friction between the brake disk 1 and the brake lining 2, and thereby generates a braking force. In this way, the disk brake controls the rotation of the wheel or axle and slows the running vehicle.

The brake lining 2 includes a plurality of friction structures 3, back boards 4 and elastic members 5 attached to the respective friction structures 3, and a base plate 6 supporting all these components. Each of the friction structures 3 is in the shape of a plate. The friction structures 3 are arranged on a surface of the base plate 6 with space in between. The respective front surfaces of the friction structures 3 face a sliding surface 1a of the brake disk 1. The friction structures 3 are made of, for example, a copper sintered material, a resin material, an iron-based sintered material or the like.

As shown in FIGS. 2B and 2C, each of the friction structures 3 has a groove 3b in its front surface, and the groove 3b traverses the surface. Each of the friction structures 3 includes two friction portions 3M and a thin portion 3C. The friction portions 3M are adjacent to each other with the groove 3b in between. The thin portion 3C is in a position corresponding to the groove 3b. The thickness of the thin portion 3C is smaller than that of the friction portions 3M. The friction portions 3M and the thin portion 3C are made of the same material, for example. The friction structure 3 is fastened to the back board 4 in any of the friction portions 3M or the thin portion 3C. The friction structure 3 is reinforced by the back board 4.

According to the embodiment, the contour shape of each of the friction structures 3 in a planar view is like an oval running track composed of two semicircles and two parallel lines that are common tangents to the two semicircles at the ends thereof. Accordingly, each of the friction structures 3 has straight sides. Therefore, the thin portion 3C has a substantially constant length in the entire region of the thin portion 3C, and the length of the thin portion 3C is almost equal to the maximum width of the friction portions 3M. Each of the friction portions 3M has a substantially constant width in a region adjacent to the thin portion 3C, and the width is almost equal to the maximum width of the friction portion 3M. The width of the friction portion 3M means a dimension thereof in a direction perpendicular to the direction where the two friction portions 3M are arranged. The length of the thin portion 3C means a dimension thereof in the width direction of the friction portions 3M (that is, in the direction perpendicular to the direction where the two friction portions 3M are arranged). Having a constant length or a constant width means that there is substantially no variation in the length or the width in the entire region extending in the direction where the two friction portions 3M are arranged.

The planar shape of each of the friction portions 3M is a combination of a rectangle and a semicircle having a center on the midpoint of a side of the rectangle. The planar shape of the thin portion 3C, that is, the planar shape of the groove 3b is a horizontally long rectangle. The groove 3b intersects with the sides of the friction structure 3 substantially at right angles.

The planar shape of each of the friction portions 3M is not limited to the above-described shape and may be a polygon, for example. The number of friction structures 3 disposed on the base plate 6 is not particularly limited.

As shown in FIGS. 2A and 2C, in the centers of the respective friction portions 3M, small holes 3a are made to pierce through the friction portions 3M in the thickness direction. In the back board 4, through holes are made in positions corresponding to the small holes 3a. Rivets 7 are inserted in the small holes 3a and the through holes. The rivets 7 fix the friction portions 3M and the back board 4 to the base plate 6. Thus, the friction structure 3 is supported by the base plate 6 at these two points (at the centers of the friction portions 3M).

Behind the friction portions 3M, elastic members 5 are inserted between the back board 4 and the base plate 6. The elastic members 5 are disposed around the rivets 7. Thereby, each of the friction portions 3M is supported elastically. FIG. 2C shows an example where disk springs are used as the elastic members 5. Plate springs, coil springs and the like may be used as the elastic members 5.

In reference to FIG. 2B, in regard to one friction structure 3, when the maximum width of the friction portions 3M is D and when the distance between support points of the friction portions 3M is L, L/D is equal to or more than 1.1. The "support points" mean the centers of the supporting members (the rivets 7 in this embodiment) supporting the friction portions 3M on the base plate 6 on the surface of the friction portions 3M. The maximum width D is, for example, 45 mm, and the distance L is, for example, 50 mm.

The friction structures 3 and the back boards 4 are deformable when an external force is applied thereto. Since each of the back boards 4 is firmly fastened to the friction structure 3, a block 9 composed of a friction structure 3 and a back board 4 deforms substantially integrally. In regard to each of the friction structures 3, because of the groove 3b, the thin portion 3C is thinner than the friction portions 3M. Therefore, each of the friction structure 3 easily bends and deforms at the thin portion 3C. This uniformizes the contact surface pressure of the brake lining 2 (friction portions 3M) against the brake disk 1 during braking motion.

In the conventional brake lining 32 shown in FIG. 1, there are no pairs of friction members 33 integrated as one member. On the other hand, the friction structure 3 shown in FIGS. 2A to 2C is a monolithic member including two friction portions 3M and a thin portion therebetween. In the conventional brake lining 32, in a planar view, each of the back boards 34 has a narrow portion in the center in the length direction. In the brake lining 2 shown in FIGS. 2A to 2C, none of the back boards 4 has such a narrow portion. Further, none of the friction structures 3 has such a narrow portion. Thus, each of the friction structures 3 has a substantially constant width in the region around the thin portion 3C.

In the configuration, the stiffness of the block 9 (the friction structure 3 and the back board 4) shown in FIGS. 2A to 2C is higher than the stiffness of each of the blocks 39 in the conventional brake lining 32. Consequently, the frictional coefficient between the brake disk 1 and the brake lining 2 can be stabilized regardless of the running speed of the vehicle at the start of braking motion. Also, since the stiffness of the block 9 is high, brake squeak can be suppressed. The increase in the stiffness of the block 9 can certainly effect suppression of brake squeak when L/D is equal to or greater than 1.1.

In order to adequately obtain the effect of uniformizing the contact surface pressure of the brake lining 2, the rate of the depth of the groove 3b to the thickness of the friction portions 3M is desirably equal to or greater than 0.06, and more desirably, equal to or greater than 0.33. In order to adequately obtain the effect of suppressing brake squeak from the increase in the stiffness of the block 9, the rate of the depth of the groove 3b to the thickness of the friction portions 3M is desirably equal to or less than 0.90, and more desirably equal to or less than 0.84. When the friction structure 3 is in an early state of being unworn, the thickness of the friction portions 3M is, for example, 5 to 15 mm, and the depth of the groove 3b is, for example, 1 to 12 mm.

As the disk brake is used, the friction portions 3M become worn. It is because the friction portions 3M are scratched against the sliding surface 1a of the brake disk 1. When any of the friction portions 3M is worn out to a level where the surface thereof recedes to a certain depth (for example, to a level where the surface thereof recedes to a level that is 1 mm above the head of the rivet 7), the friction structure 3 having the worn friction portion 3M is replaced with a new one. It is preferred that the rate of the depth of the groove 3b to the thickness of the friction portion 3M meets the requirements above even when the friction portion 3M is worn out to the level.

Each of the friction structures 3 is fastened to the base plate 6 by two rivets 7. Therefore, it never happens that any of the friction structures 3 turns during braking motion. Accordingly, the fastening between each of the friction structures 3 and the base plate 6 can be prevented from getting loose. Even if the fastening gets loose, the friction structure 3 will never come off unless both of the two fasteners are broken. Therefore, sufficient durability and sufficient reliability of the disk brake can be ensured.

Each of the friction portions 3M is elastically supported with the position of the rivet 7 acting as a support point. Therefore, each of the friction portions 3M will never slant largely relative to the base plate 6 though capable of slanting by contact with the brake disk 1 during braking motion.

Accordingly, the entire contact surface of the friction portion 3M to come into contact with the brake disk 1 will become worn uniformly. Then, it never happens that any of the friction portions 3M is partly abraded.

When the brake lining 2 is to be applied to an existing vehicle having a disk brake, for example, it is only necessary to modify the friction structures or blocks to meet the requirements set by the present embodiment, and it is not necessary to make changes to the brake caliper or other components. In the brake lining 2, it is not necessary to adjust the support stiffness of the elastic members 5 according to the locations thereof on the base plate 6. Thus, it is easy to apply the brake lining 2 to an existing vehicle, and it is easy to manage the manufacture of the brake lining 2.

EXAMPLES

In order to confirm the effects of the present embodiment, brake linings, which had different types of blocks (back boards and friction structures) as shown in Table 1, were evaluated in squeak index. The squeak indices were calculated from the results of analysis in the FEM (finite element method). Specifically, first, damping ratios of oscillations at various frequencies were calculated from FEM complex eigenvalue analysis. The negative values, that is, unstable values among the results in each frequency range with a ⅓ octave band were summed up, and the absolute value of the sum was obtained for the frequency range. The maximum value in each frequency range is extracted and set as a maximum squeak index value. A smaller maximum squeak index value indicates a smaller squeak.

TABLE 1

| Classification | L/D | Narrow Portion of Back Board | Narrow Portion of Friction Structure |
|---|---|---|---|
| Comparative Example 1 | 1.11 | Yes | Yes |
| Comparative Example 2 | 1.11 | No | Yes |
| Inventive Example | 1.11 | No | No |
| Comparative Example 3 | 1.06 | Yes | Yes |
| Comparative Example 4 | 1.06 | No | No |

In any of the comparative examples and the inventive example, the frictional structures were monolithic. "No" in the item of "narrow portion of friction structure" means that each of the friction structures had straight sides and had no narrow portions in a planar view as described above. "Yes" in the item of "narrow portion of friction structure" means that each of the friction structures had a narrow portion, that is, had a minimum width in the middle with respect to the length direction same as the shape of the back board 34 shown in FIG. 1. Except for the narrow portion, the friction structures with a narrow portion were the same shape and size as the friction structures with no narrow portions.

In any of the examples other than the comparative example 2, in a planar view, each of the back boards had a contour overlapping the contour of the friction structure which the back board was fastened to. The back boards with no narrow portions (with an indication of "No" in the item of "narrow portion of back board) were the same shape and size as the friction structures with no narrow portions. The back boards with a narrow portion (with an indication of "Yes" in the item of "narrow portion of back board) were the same shape and size as the friction structures with a narrow portion. In the comparative example 2, in a planar view, each of the back boards had a contour overlapping the contour of the friction structure which the back board was fastened to, except for the narrow portion.

In any of the examples, in a planar view, the groove of each of the friction structures was rectangular and was made to extend perpendicularly to both sides of the friction structure.

Figure 3:
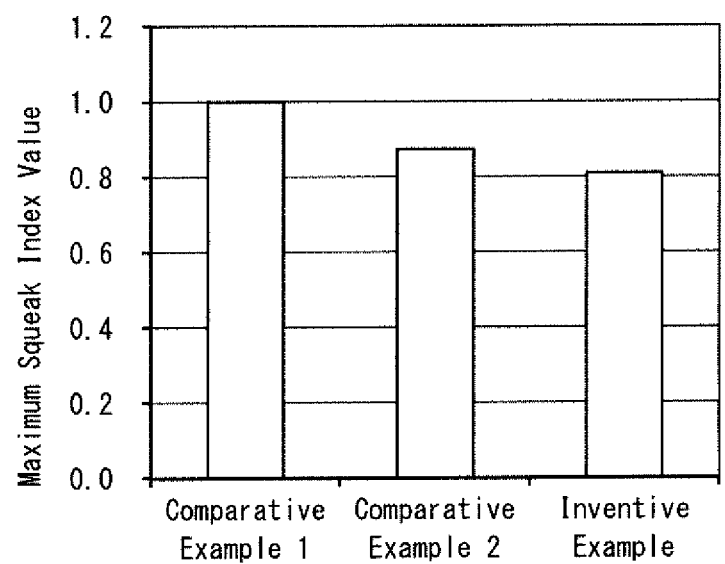
FIG. 3 is a diagram showing maximum squeak index values of an inventive example and comparative examples 1 and 2.

FIG. 3 shows the maximum squeak index values of the inventive example (wherein L/D was 1.11) and the comparative examples 1 and 2. FIG. 3 shows the maximum index values as rates when assuming the maximum index value of the comparative example 1 as 1.

The maximum squeak index value of the comparative example 2 was smaller than the maximum squeak index value of the comparative example 1. This shows that eliminating the narrow portions of the back boards resulted in a decrease in the maximum squeak index value. The maximum squeak index value of the inventive example was smaller than the maximum squeak index value of the comparative example 2. This shows that eliminating the narrow portions of the friction structures resulted in a decrease in the maximum squeak index value.

The results show that when L/D is 1.11 (which is equal to or greater than 1.1), increasing the stiffness of each entire block composed of a back board and a friction structure results in a decrease in the maximum squeak index value.

Figure 4:
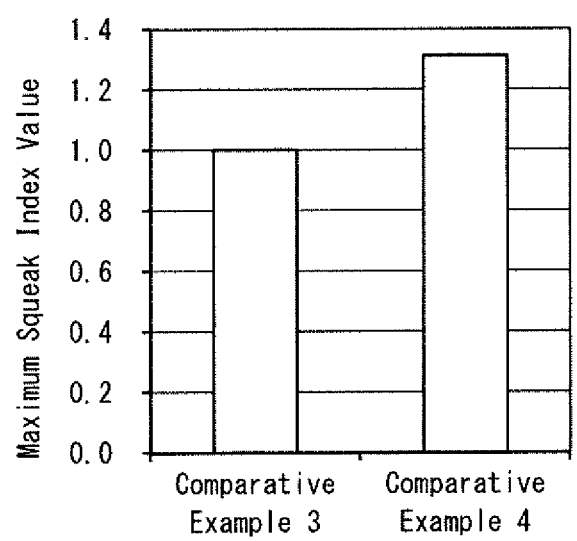
FIG. 4 is a diagram showing maximum squeak index values of comparative examples 3 and 4.

FIG. 4 shows the maximum squeak index values of the comparative examples 3 and 4 (where L/D was 1.06). FIG. 4 shows the maximum index values as rates when assuming the maximum index value of the comparative example 3 as 1. As shown in FIG. 4, the maximum squeak index value of the comparative example 4 was greater than the maximum squeak index value of the comparative example 3. This shows that eliminating the narrow portions of both of the back boards and the friction structures results in an increase in the maximum squeak index value rather than a decrease in the maximum squeak index value. This shows that increasing the stiffness of each entire block composed of a back board and a friction structure does not result in a decrease in the maximum squeak index value when L/D is 1.06 (which is less than 1.1).

An embodiment of the present invention has been described above. The embodiment is merely an example showing how to carry out the invention. Therefore, the present invention is not limited to the embodiment, and it is possible to modify the embodiment in various ways without departing from the scope of the invention.

INDUSTRIAL APPLICABILITY OF INVENTION

Railway brake linings according to the present invention and disk brakes equipped with such a brake lining can be effectively utilized in various railway vehicles. These railway brake linings and disk brakes can be effectively utilized especially in high-speed railway vehicles which can run at various speeds in a wide range from low speed to high speed.

LIST OF REFERENCE SYMBOLS

1: brake disk
$1a$: sliding surface
2: brake lining
3: friction structure
$3b$: groove
3C: thin portion
3M: friction portion
4: back board
5: elastic member 6: base plate
7: rivet

The invention claimed is:

1. A brake lining configured to be pressed against a sliding surface of a brake disk fastened to a wheel or an axle of a railway vehicle, the brake lining comprising:
   a plurality of friction structures of which front surfaces are to face the sliding surface of the brake disk;
   back boards fastened to respective back surfaces of the friction structures;
   a base plate supporting the friction structures; and
   elastic members located behind the respective friction structures, between the base plate and the respective back boards; wherein:
   each of the friction structures includes two adjacent friction portions with a groove formed in the front surface in between, and a thin portion with a smaller thickness than thicknesses of the friction portions, the thin portion located in a position corresponding to the groove;
   in a planar view, one of the two adjacent friction portions in each of the friction structures has a straight side opposing to the other of the two adjacent friction portions;
   each of the friction structures is supported by the base plate on two support points located in the two friction portions respectively;
   in a planar view, each of the back boards has a contour overlapping a contour of the friction structure which the back board is fastened to; and
   the thin portion has a constant length in a width direction of the friction portions, the length being equal to a maximum width of the friction portions and satisfying a condition that L/D is equal to or greater than 1.1, where D denotes the length of the thin portion and L denotes a distance between the two support points located in the friction portions.

2. The brake lining according to claim 1, wherein the thin portion is rectangular in planar shape.

3. A disk brake comprising:
   a brake disk fastened to a wheel or an axle of a railway vehicle; and
   the brake lining according to claim 1 to be pressed against a sliding surface of the brake disk.

4. A disk brake comprising:
   a brake disk fastened to a wheel or an axle of a railway vehicle; and
   the brake lining according to claim 2 to be pressed against a sliding surface of the brake disk.

5. The brake lining according to claim 1, wherein each friction structure is a monolithic member.

6. The brake lining according to claim 1, wherein each friction structure and the back board fastened to the friction structure deform integrally.

7. A disk brake comprising:
   a brake disk fastened to a wheel or an axle of a railway vehicle; and
   the brake lining according to claim 5 to be pressed against a sliding surface of the brake disk.

8. A disk brake comprising:
   a brake disk fastened to a wheel or an axle of a railway vehicle; and
   the brake lining according to claim 6 to be pressed against a sliding surface of the brake disk.

* * * * *